(12) United States Patent
Abe

(10) Patent No.: US 7,456,675 B2
(45) Date of Patent: Nov. 25, 2008

(54) SEMICONDUCTOR INTEGRATED CIRCUIT DEVICE FOR PREVENTING GENERATION OF IRREGULAR CLOCK SIGNAL

(75) Inventor: Makio Abe, Hokkaido (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/673,643

(22) Filed: Feb. 12, 2007

(65) Prior Publication Data
US 2007/0188212 A1  Aug. 16, 2007

(30) Foreign Application Priority Data
Feb. 14, 2006  (JP)  ............... 2006-037282
Jan. 22, 2007  (JP)  ............... 2007-011481

(51) Int. Cl.
*G06F 1/04* (2006.01)
(52) U.S. Cl. ............ 327/298; 327/99; 327/294
(58) Field of Classification Search ............... 327/99, 327/293, 294, 298, 407; 326/93, 96
See application file for complete search history.

(56) References Cited

U.S. PATENT DOCUMENTS

| 4,965,524 A | * | 10/1990 | Patchen ............ 327/99 |
| 5,289,050 A | * | 2/1994 | Ogasawara ............ 327/141 |
| 5,483,185 A | * | 1/1996 | Scriber et al. ............ 327/99 |
| 5,652,536 A | * | 7/1997 | Nookala et al. ............ 327/298 |
| 6,600,345 B1 | * | 7/2003 | Boutaud ............ 327/99 |
| 6,845,490 B2 | * | 1/2005 | Natsume ............ 716/1 |
| 6,882,184 B2 | * | 4/2005 | Yamazaki ............ 327/99 |

FOREIGN PATENT DOCUMENTS

JP    2001-174534    6/2001

* cited by examiner

*Primary Examiner*—Lincoln Donovan
*Assistant Examiner*—Hai L. Nguyen
(74) *Attorney, Agent, or Firm*—Ladas & Parry LLP

(57) ABSTRACT

A disclosed semiconductor integrated circuit device includes a selection circuit that is supplied with a first clock signal and a second clock signal, a selection signal, and a switching signal, and configured to select one of the first clock signal and the second clock signal according to the selection signal and to change the selected one of the first clock signal and the second clock signal to the other one of the first clock signal and the second clock signal according to the switching signal. The disclosed semiconductor integrated circuit device also includes an output fixing circuit configured to generate a pulse that is maintained at a high level or a low level during a certain period, to perform an OR operation on the output signal from the selection circuit and the generated pulse, and to output a result of the OR operation as the output clock signal.

5 Claims, 5 Drawing Sheets

FIG.3

| SELECTION SIGNAL CKSEL | SWITCHING SIGNAL CKCHG | SELECTED CLOCK SIGNAL |
|---|---|---|
| 0 | 0 | CLK1 |
| 0 | 1 | CLK2 |
| 1 | 0 | CLK2 |
| 1 | 1 | CLK1 |

SEMICONDUCTOR INTEGRATED CIRCUIT DEVICE FOR PREVENTING GENERATION OF IRREGULAR CLOCK SIGNAL

BACKGROUND OF THE INVENTION

1. Field of the Invention

The present invention generally relates to a semiconductor integrated circuit device, and more particularly relates to a semiconductor integrated circuit device that selects one of a first clock signal and a second clock signal having different phases and outputs and supplies the selected one of the first clock signal and the second clock signal to a downstream circuit.

2. Description of the Related Art

In recent years, lithium ion batteries have become commonly used in portable devices such as digital cameras. Generally, it is difficult to measure the remaining battery power of a lithium ion battery based on its voltage. Therefore, for example, the remaining battery power of a lithium ion battery is calculated by measuring and totaling the amounts of charge-and-discharge currents of the lithium ion battery with, for example, a microprocessor (patent document 1).

For example, fuel gauge ICs are used for measuring remaining battery power as described above and are available in the market place. A fuel gauge IC includes a CPU and a memory and calculates remaining battery power by converting measured amounts of charge-and-discharge currents into digital data. Therefore, a fuel gauge IC requires an oscillation circuit to drive a CPU, a memory, and so on.

To save costs and the mounting area on a substrate, an internal oscillation circuit has been commonly used as the oscillation circuit of a fuel gauge IC. Meanwhile, to accurately calculate remaining battery power, it is necessary to accurately calculate time. For this purpose, it is preferable to have an oscillation circuit with an external crystal oscillator. Also, it is more preferable to provide both an internal oscillation circuit and a crystal oscillation circuit in a fuel gauge IC so that a clock signal generated by the internal oscillation circuit or a clock signal generated by the crystal oscillation circuit can be selected and supplied to the CPU according to need.

In a conventional clock signal switching method, clock signals are switched as described below.

FIG. 5 is a drawing used to describe the conventional clock signal switching method. FIG. 5(A) shows a clock signal A, FIG. 5(B) shows a clock signal B, FIG. 5(C) shows an output clock signal, and FIG. 5(D) shows a clock switching signal.

The clock signal A is, for example, output from an internal oscillation circuit, and the clock signal B is, for example, output from a crystal oscillation circuit.

As shown in FIG. 5, since the internal oscillation circuit and the crystal oscillation circuit are not synchronized, there is a phase shift between the clock signals A and B. When the clock switching signal rises at time t1 as shown by FIG. 5(D) and the clock signal A is thereby changed to the clock signal B, an irregular clock signal with a frequency higher than that of the clock signals A and B may be generated as the output clock signal as shown by FIG. 5(C).

[Patent document 1] Japanese Patent Application Publication No. 2001-174534

As described above, in the conventional clock signal switching method, an irregular clock signal with a frequency higher than that of the clock signals A and B may be generated. Such an irregular clock signal may cause, for example, the CPU, which is supplied with the clock signal A or B, to malfunction.

Although it is possible to eliminate the influence of such an irregular clock signal on the CPU by using a program, processing by such a program becomes very complicated.

SUMMARY OF THE INVENTION

The present invention provides a semiconductor integrated circuit device that substantially obviates one or more problems caused by the limitations and disadvantages of the related art.

Embodiments of the present invention provide a semiconductor integrated circuit device that prevents an irregular clock signal with a high frequency from being generated when clock signals are switched.

According to an embodiment of the present invention, a semiconductor integrated circuit device includes a selection circuit that is supplied with a first clock signal and a second clock signal having different phases, a selection signal, and a switching signal to be changed in synchronization with an output clock signal, and is configured to select one of the first clock signal and the second clock signal according to the selection signal and to change the selected one of the first clock signal and the second clock signal to the other one of the first clock signal and the second clock signal according to the switching signal; and an output fixing circuit configured to generate a pulse based on the switching signal and an output signal from the selection circuit which pulse is maintained at a high level or a low level during a period between time when the output signal from the selection circuit falls or rises after the switching signal is changed and time when the fallen or risen output signal from the selection circuit successively rises or falls, to perform an OR operation on the output signal from the selection circuit and the generated pulse, and to output a result of the OR operation as the output clock signal.

BRIEF DESCRIPTION OF THE DRAWINGS

FIG. 3 is a table used to describe exemplary operations of a selection circuit;

DESCRIPTION OF THE PREFERRED EMBODIMENTS

Preferred embodiments of the present invention are described below with reference to the accompanying drawings.

[Configuration]

Figure 1:
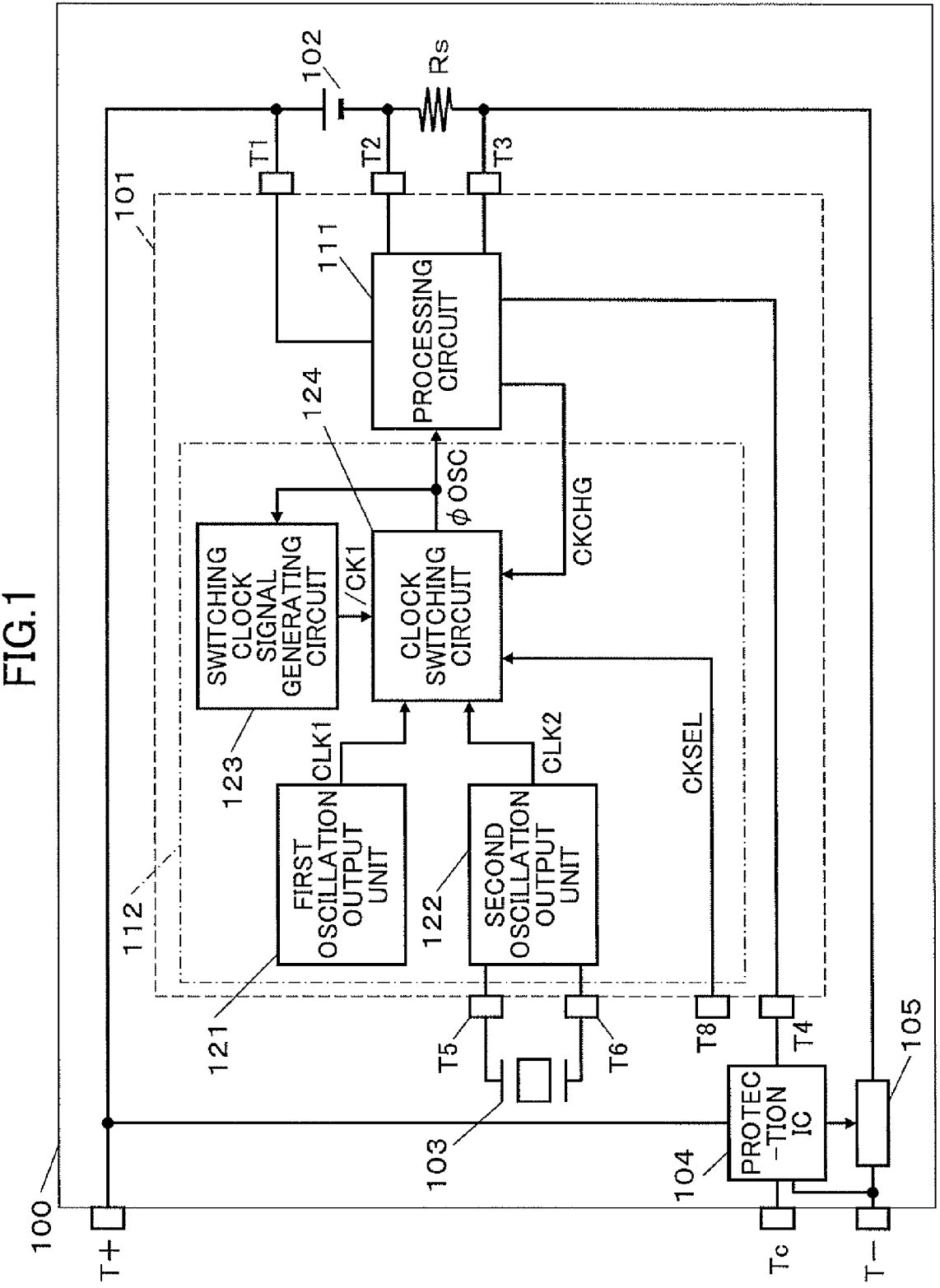
FIG. 1 is a block diagram illustrating an embodiment of the present invention.

FIG. 1 is a block diagram illustrating an embodiment of the present invention.

In this embodiment, for descriptive purpose, a remaining battery power measuring device is used as an example of a semiconductor integrated circuit device. A remaining battery power measuring device 101 is made of a one-chip semiconductor integrated circuit and is provided in a battery pack 100.

The remaining battery power measuring device 101 includes a processing circuit 111 and an oscillation circuit unit 112. The processing circuit 111 includes a CPU, a ROM, an EEPROM, a RAM, a register, an interface circuit, and a detection circuit (that are not shown). The voltage of a lithium ion battery 102 is applied to a terminal T1 and voltages at corresponding ends of a charge-and-discharge current detecting resistance Rs, which is connected in series with the lithium ion battery 102, are applied to terminals T2 and T3, respectively. The processing circuit 111 is driven by an output clock signal φOSC supplied from the oscillation circuit unit 112.

The CPU executes a program stored in the ROM to obtain the voltage and the amounts of charge-and-discharge currents of the lithium ion battery 102 from the detection circuit and calculates the total of the obtained amounts of charge-and-discharge currents to obtain the remaining battery power of the lithium ion battery 102. The remaining battery power calculated by the processing circuit 111 is output from the interface circuit via a terminal T4 and a protection IC 104 to a communication terminal Tc and then output to the outside.

The register in the processing circuit 111 retains a switching signal CKCHG. The switching signal CKCHG is rewritable by a program executed by the CPU.

The protection IC 104 detects abnormal conditions such as an overcharge, an overdischarge, and a short circuit based on the voltage between terminals T+ and T− and the current at the terminal T−. When detecting an abnormal condition, the protection IC 104 opens a switch circuit 105 and thereby protects a load connected to the lithium ion battery 102 via the terminals T+ and T−.

[Oscillation Circuit Unit 112]

The oscillation circuit unit 112 includes a first oscillation output unit 121, a second oscillation output unit 122, a switching clock signal generating circuit 123, and a clock switching circuit 124.

The first oscillation output unit 121 includes an oscillation circuit built in a semiconductor integrated circuit such as a ring oscillator and generates a first clock signal CLK1 with the oscillation circuit. The first clock signal CLK1 generated by the first oscillation output unit 121 is supplied to the clock switching circuit 124.

The second oscillation output unit 122 generates a second clock signal CLK2 by using the oscillation of an oscillator 103 connected to terminals T5 and T6. Since the second oscillation output unit 122 uses an oscillator, it can generate the second clock signal CLK2 with high accuracy. The second clock signal CLK2 generated by the second oscillation output unit 122 is supplied to the clock switching circuit 124. The switching clock signal generating circuit 123 is supplied with an output clock signal φOSC from the clock switching circuit 124. The switching clock signal generating circuit 123 generates a first switching clock signal CK1 and a second switching clock signal CK2 that rise alternately at the falling edges of the output clock signal φOSC and supplies a switching clock signal /CK1, which is an inverted signal of the first switching clock signal CK1, to the clock switching circuit 124.

[Clock Switching Circuit 124]

Figure 2:
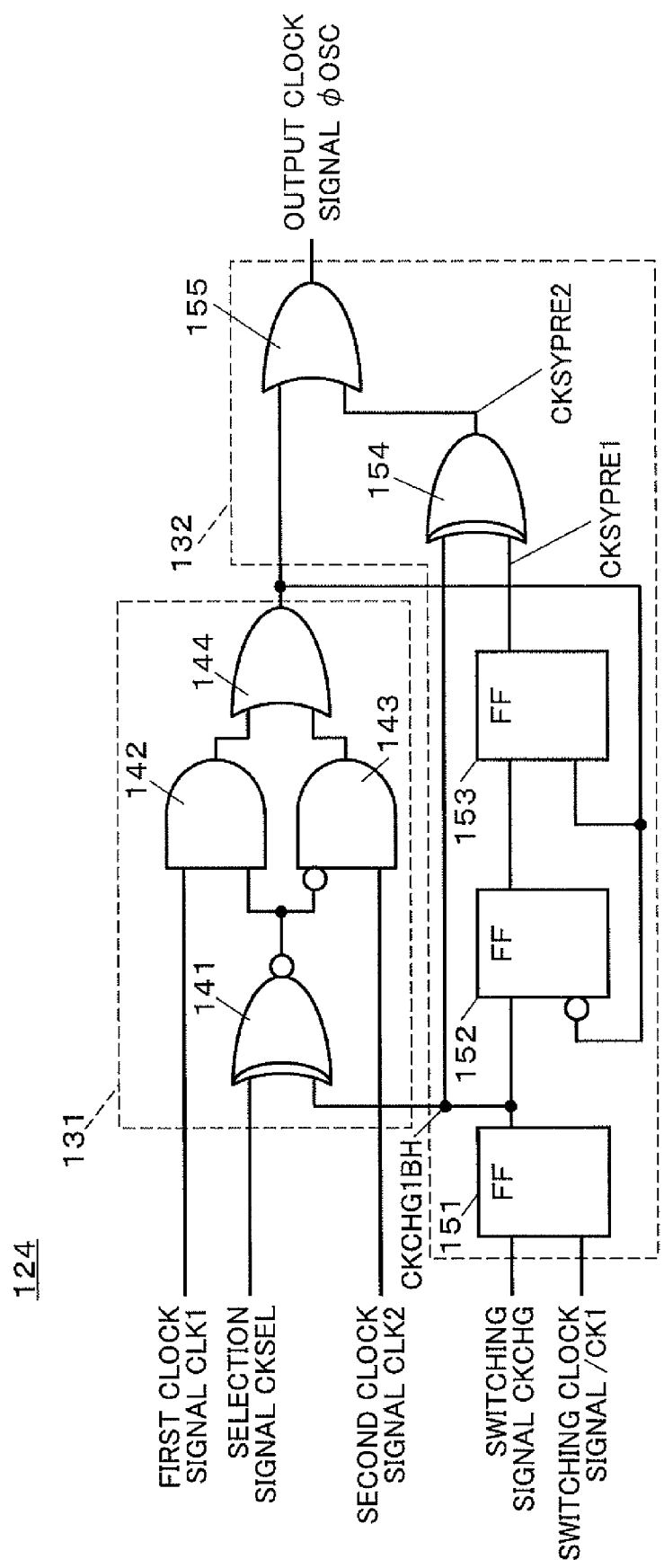
FIG. 2 is a circuit diagram of an exemplary clock switching circuit.

FIG. 2 is a circuit diagram illustrating an exemplary configuration of the clock switching circuit 124.

The clock switching circuit 124 selects the first clock signal CLK1 or the second clock signal CLK2 according to the value of a selection signal CKSEL supplied from a terminal T8. The clock switching circuit 124 also changes the selected clock signal from the first clock signal CLK1 to the second clock signal CLK2 or vice versa according to the value of the switching signal CKCHG supplied from the processing circuit ill and thereby changes the output clock signal φOSC. The clock switching circuit 124 includes a selection circuit 131 and an output fixing circuit 132.

[Selection Circuit 131]

The selection circuit 131 selects the first clock signal CLK1 or the second clock signal CLK2 according to the switching signal CKCHG and includes an EX-NOR (exclusive NOR) gate 141, AND gates 142 and 143, and an OR gate 144.

The EX-NOR gate 141 is supplied with the selection signal CKSEL from the terminal TS and an output fixing signal CKCHG1BH from the output fixing circuit 132. The EX-NOR gate 141 performs an exclusive NOR operation on the selection signal CKSEL and the output fixing signal CKCHG1BH and outputs a resulting signal.

The AND gate 142 is supplied with the first clock signal CLK1 from the first oscillation output unit 121 and the output signal from the EX-NOR gate 141. The AND gate 142 performs an AND operation on the first clock signal CLK1 and the output signal from the EX-NOR gate 141 and outputs a resulting signal.

The AND gate 143 is supplied with the second clock signal CLK2 from the second oscillation output unit 122 and an inverted signal of the output signal from the EX-NOR gate 141. The AND gate 143 performs an AND operation on the second clock signal CLK2 and the inverted signal of the output signal from the EX-NOR gate 141 and outputs a resulting signal.

The OR gate 144 is supplied with the output signals from the AND gates 142 and 143. The OR gate 144 performs an OR operation on the output signals from the AND gates 142 and 143 and outputs a resulting signal. The output signal from the OR gate 144 is supplied to the output fixing circuit 132.

In other words, the selection circuit 131 outputs the first clock signal CLK1 when the output fixing signal CKCHG1BH is 0 and the selection signal CKSEL is 0 and outputs the second clock signal CLK2 when the output fixing signal CKCHG1BH is 0 and the selection signal CKSEL is 1. On the other hand, the selection circuit 131 outputs the second clock signal CLK2 when the output fixing signal CKCHG1BH is 1 and the selection signal CKSEL is 0 and outputs the first clock signal CLK1 when the output fixing signal CKCHG1BH is 1 and the selection signal CKSEL is 1.

[Output Fixing Circuit 132]

The output fixing circuit 132 is provided between the selection circuit 131 and an output terminal and includes flip-flops 151, 152, and 153, an EX-OR gate 154, and an OR gate 155.

The flip-flop 151 is supplied with the switching signal CKCHG from the processing circuit ill via a data input terminal and the switching clock signal /CK1 from the switching clock signal generating circuit 123 via a clock signal input terminal. The flip-flop 151 latches the switching signal CKCHG at the rising edge of the switching clock signal /CK1 (at the falling edge of the switching clock signal CK1) and outputs the latched signal. The output signal from the flip-flop 151 is supplied as the output fixing signal CKCHG1BH to the flip-flop 152 and the EX-NOR gate 141 of the selection circuit 131.

The flip-flop 152 is supplied with the output fixing signal CKCHG1BH from the flip-flop 151 via a data input terminal and an inverted signal of the output signal from the selection circuit 131 via a clock signal input terminal. The flip-flop 152 latches the output fixing signal CKCHG1BH at a timing when the output signal from the selection circuit 131 falls from the high level to the low level and outputs the latched signal. The output signal from the flip-flop 152 is supplied to the flip-flop 153.

The flip-flop 153 is supplied with the output signal from the flip-flop 152 via a data input terminal and the output signal from the selection circuit 131 via a clock signal input terminal. The flip-flop 153 latches the output signal from the flip-flop 152 at a timing when the output signal from the selection circuit 131 rises from the low level to the high level and outputs the latched signal as CKSYPRE1. The output signal CKSYPRE1 from the flip-flop 153 is supplied to the EX-OR gate 154.

The EX-OR gate 154 is supplied with the output fixing signal CKCHG1BH and the output signal CKSYPRE1. The EX-OR gate 154 performs an EX-OR operation on the output fixing signal CKCHG1BH and the output signal CKSYPRE1 and outputs a resulting signal CKSYPRE2. The output signal CKSYPRE2 from the EX-OR gate 154 is supplied to the OR gate 155.

The output signal CKSYPRE2 is a signal that is maintained at the high level during the period between the time when the output signal from the selection circuit 131 falls from the high level to the low level after the output fixing signal CKCHG1BH is changed to the high level (or the low level) and the time when the fallen output signal from the selection circuit 131 successively rises from the low level to the high level.

The OR gate 155 is supplied with the output signal from the selection circuit 131 and the output signal CKSYPRE2 from the X-OR gate 154. The OR gate 155 performs an OR operation on the output signal from the selection circuit 131 and the output signal CKSYPRE2 from the X-OR gate 154 and outputs a resulting signal. The output signal from the OR gate 155 is supplied as the output clock signal φ OSC to the processing circuit 111.

[Operations]

FIG. 3 is a table used to describe exemplary operations of the selection circuit 131.

In the selection circuit 131, when the selection signal CKSEL is 0 and the switching signal CKCHG is 0, the output signal from the EX-NOR gate 141 becomes 1. In this caser the AND gate 142 becomes active and the AND gate 143 becomes inactive. As a result, the first clock signal CLK1 is output through the AND gate 142.

When the selection signal CKSEL is 0 and the switching signal CKCHG is 1, the output signal from the EX-NOR gate 141 becomes 0. In this case, the AND gate 142 becomes inactive and the AND gate 143 becomes active. As a result, the second clock signal CLK2 is output through the AND gate 143.

When the selection signal CKSEL is 1 and the switching signal CKCHG is 0, the output signal from the EX-NOR gate 141 becomes 0. In this case, the AND gate 142 becomes inactive and the AND gate 143 becomes active. As a result, the second clock signal CLK2 is output through the AND gate 143.

When the selection signal CKSEL is 1 and the switching signal CKCHG is 1, the output signal from the EX-NOR gate 141 becomes 1. In this case, the AND gate 142 becomes active and the AND gate 143 becomes inactive. As a result, the first clock signal CLK1 is output through the AND gate 142.

Figure 4:
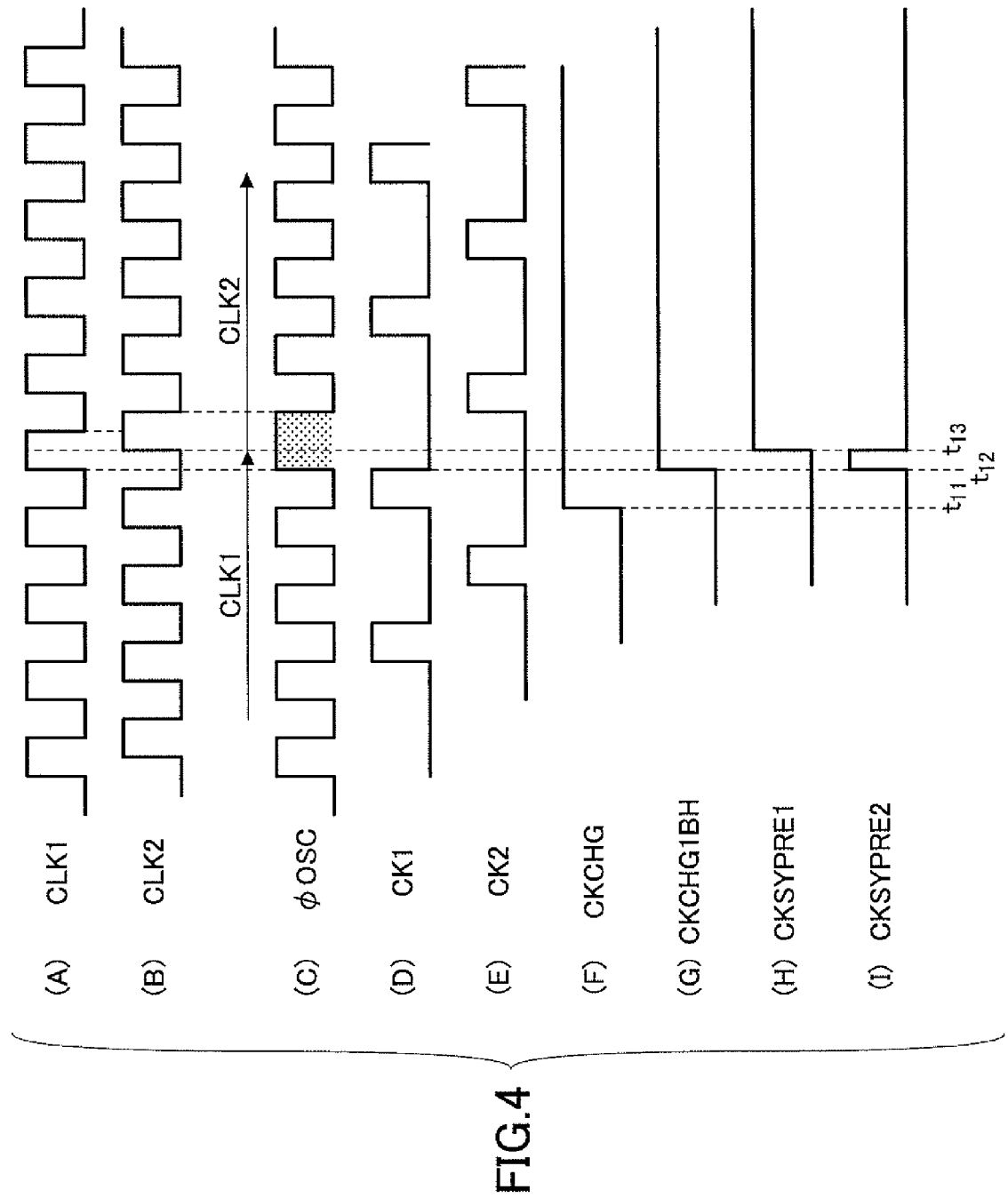
FIG. 4 is a drawing used to describe exemplary operations of the exemplary clock switching circuit.
Figure 5:
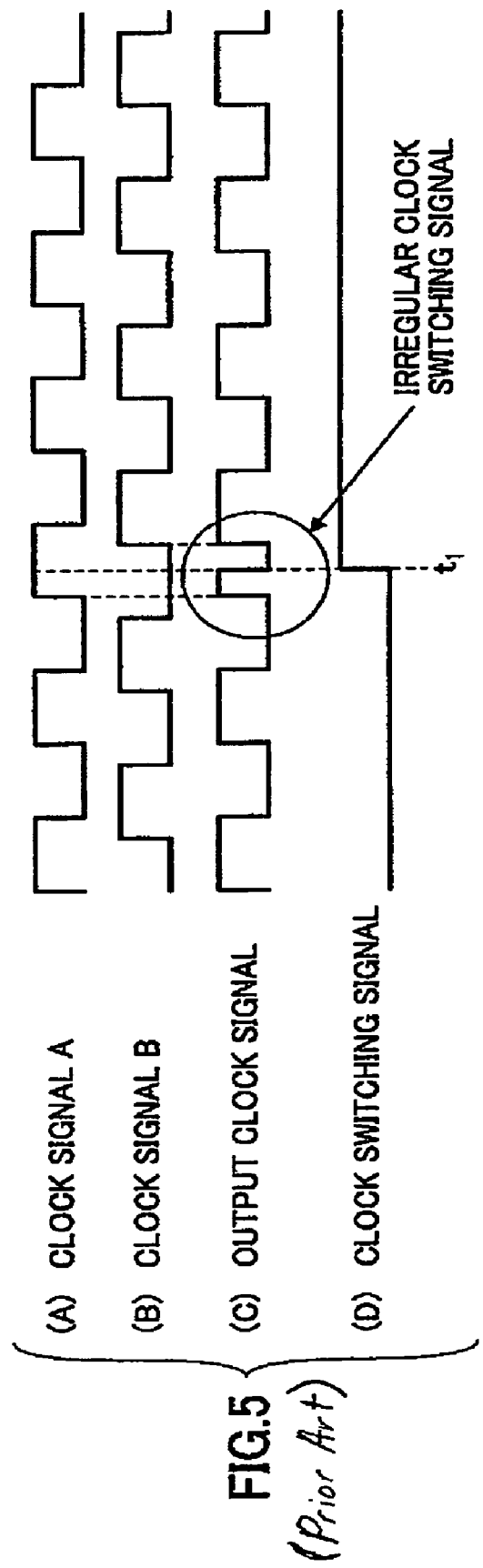
FIG. 5 is a drawing used to describe a conventional clock signal switching method.

FIG. 4 is a drawing used to describe exemplary operations of the clock switching circuit 124. FIG. 4(A) shows the first clock signal CLK1, FIG. 4(B) shows the second clock signal CLK2, FIG. 4(C) shows the output clock signal φ OSC, FIG. 4(D) shows the first switching clock signal CK1, FIG. 4(E) shows the second switching clock signal CK2, FIG. 4(F) shows the switching signal CKCHG, FIG. 4(G) shows the output fixing signal CKCHG1BH, FIG. 4(H) shows the output signal CKSYPRE1, and FIG. 4(I) shows the output signal CKSYPRE2.

While the first clock signal CLK1 is being output as the output clock signal φ OSC, if the selection signal CKSEL is changed to 0 and the switching signal CKCHG is changed to 1 or the high level at time t11 and the first switching clock signal CK1 falls at time t12 as shown by FIG. 4(D), the inverted switching clock signal /CK1 rises. When the switching clock signal /CK1 rises, the output fixing signal CKCHG1BH from the flip-flop 151 rises to the high level.

When the output fixing signal CKCHG1BH from the flip-flop 151 rises to the high level, the output signal from the selection circuit 131 changes from the first clock signal CLK1 to the second clock signal CLK2. Also, when the output fixing signal CKCHG1BH from the flip-flop 151 rises to the high level, the output signal CKSYPRE2 from the EX-OR gate 154 rises to the high level. As a result, the output clock signal φ OSC from the OR gate 155 rises to the high level.

Then, the second clock signal CLK2 rises to the high level at time t13 and the output clock from the selection circuit 131 rises to the high level. As a result, the output clock signal φ OSC from the OR gate 155 is maintained at the high level. Also, when the output clock from the selection circuit 131 rises to the high level, the output signal CKSYPRE1 from the flip-flop 153 rises to the high level as shown by FIG. 4(H).

When the output signal CKSYPRE1 from the flip-flop 153 rises to the high level, the output signal CKSYPRE2 from the EX-OR gate 154 falls to the low level as shown by FIG. 4(I).

As a result, the output clock signal φ OSC from the OR gate 155 is changed to the second clock signal CLK2 output from the selection circuit 131.

According to this embodiment, even when the first clock signal CLK1 is changed to the second clock signal CLK2 or vice versa, the output clock signal φ OSC is maintained at the high level longer than normal for a period of time corresponding to the phase shift between the first clock signal CLK1 and the second clock signal CLK2, and no irregular clock signal, which has a frequency higher than that of the first clock signal CLK1 and the second clock signal CLK2, is generated.

The first clock signal CLK1 and the second clock signal CLK2 may have frequencies different from each other. Also, the above embodiment uses hardware for switching clock signals and therefore makes it possible to switch clock signals at a very fast speed.

In the above embodiment, the output fixing circuit 132 generates a pulse (output signal CKSYPRE2) that is maintained at the high level during the period between the time when the output signal from the selection circuit 131 falls to the low level and the time when the fallen output signal from the selection circuit 131 successively rises to the high level. However, the clock switching circuit 124 may be configured to generate a pulse that is maintained at the low level during the period between the time when the output signal from the selection circuit 131 rises to the high level and the time when the risen output signal from the selection circuit 131 successively falls to the low level, and to perform an OR operation on the generated pulse and the output signal from the selection circuit 131. Such a configuration may also make it possible to prevent an irregular clock signal with a high frequency from being generated when clock signals are switched.

The present invention is not limited to the specifically disclosed embodiments, and variations and modifications may be made without departing from the scope of the present invention.

The present application is based on Japanese Priority Application No. 2006-037282 filed on Feb. 14, 2006 and Japanese Priority Application No. 2007-011481 filed on Jan. 22, 2007, the entire contents of which are hereby incorporated herein by reference.

What is claimed is:

1. A semiconductor integrated circuit device, comprising:
   a switching clock signal generating circuit configured to generate a switching clock signal based on an output clock signal;
   a selection circuit that is supplied with a first clock signal and a second clock signal having different phases, a selection signal, and a switching signal to be changed based on the switching clock signal, and is configured to select one of the first clock signal and the second clock signal as an output signal according to the selection signal and to change output signal to the other one of the first clock signal and the second clock signal according to the switching signal; and
   an output fixing circuit configured to receive the switching clock signal from the switching clock signal generating circuit, to change the switching signal based on the switching clock signal, and to supply the changed switching signal to the selection circuit, and configured to generate a pulse based on the switching signal and an output signal from the selection circuit which pulse is maintained at a high level or a low level during a period between a time when the output signal from the selection circuit falls or rises after the switching signal is changed and a time when the fallen or risen output signal from the selection circuit successively rises or falls, to perform an OR operation on the output signal from the selection circuit and the generated pulse, and to output a result of the OR operation as the output clock signal.

2. The semiconductor integrated circuit device as claimed in claim 1, further comprising:
   an external terminal configured to supply the selection signal.

3. The semiconductor integrated circuit device as claimed in claim 2, further comprising:
   a register configured to retain and supply the switching signal.

4. The semiconductor integrated circuit device as claimed in claim 3, wherein the selection circuit includes
   a first logical circuit configured to perform an exclusive NOR operation on the selection signal and the switching signal;
   a second logical circuit configured to perform an AND operation on the first clock signal and an output signal from the first logical circuit;
   a third logical circuit configured to perform, an AND operation on the second clock signal and an inverted signal of the output signal from the first logical circuit; and
   a fourth logical circuit configured to perform an OR operation on the output signal from the second logical circuit and the output signal from the third logical circuit 5. The semiconductor integrated circuit device as claimed in claim 4, wherein the output fixing circuit includes
   a first flip-flop configured to latch the switching signal at a falling edge of the output signal from the selection circuit;
   a second flip-flop configured to latch an output signal from the first flip-flop at a rising edge of the output signal from the selection circuit;
   a fifth logical circuit configured to perform an exclusive OR operation on the switching signal and an output signal from the second flip-flop and to output a result of the exclusive OR operation as the pulse; and
   a sixth logical circuit configured to perform an OR operation on the pulse from the fifth logical circuit and the output signal from the selection circuit and to output a result of the OR operation as the output clock signal.

* * * * *